(12) United States Patent
Kim et al.

(10) Patent No.: US 11,971,315 B2
(45) Date of Patent: Apr. 30, 2024

(54) FORCE SENSOR

(71) Applicant: DAEGU GYEONGBUK INSTITUTE OF SCIENCE AND TECHNOLOGY, Daegu (KR)

(72) Inventors: June Seo Kim, Anyang-si (KR); Myoung Jae Lee, Hwaseong-si (KR); Hyeon Jun Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 323 days.

(21) Appl. No.: 17/427,775

(22) PCT Filed: Jul. 23, 2019

(86) PCT No.: PCT/KR2019/009066
§ 371 (c)(1),
(2) Date: Aug. 2, 2021

(87) PCT Pub. No.: WO2020/218679
PCT Pub. Date: Oct. 29, 2020

(65) Prior Publication Data
US 2022/0120624 A1    Apr. 21, 2022

(30) Foreign Application Priority Data
Apr. 25, 2019   (KR) .................. 10-2019-0048304

(51) Int. Cl.
*G01L 1/12*   (2006.01)
*H01F 10/14*   (2006.01)
*H01F 10/32*   (2006.01)

(52) U.S. Cl.
CPC .............. *G01L 1/122* (2013.01); *H01F 10/14* (2013.01); *H01F 10/325* (2013.01); *H01F 10/3254* (2013.01)

(58) Field of Classification Search
CPC . G01L 1/12; G01L 1/122; H01F 10/14; H01F 10/325; H01F 10/3254; H01F 10/3286; H01F 7/02
See application file for complete search history.

(56) References Cited

U.S. PATENT DOCUMENTS

| 2004/0050172 A1 | 3/2004 | Quandt et al. |
| 2012/0008383 A1* | 1/2012 | Gapihan .......... G11C 11/16 365/173 |

(Continued)

FOREIGN PATENT DOCUMENTS

| JP | 2005-303302 A | 10/2005 |
| KR | 2007-0042746 A | 4/2007 |
| KR | 19-20440 B | 11/2019 |

OTHER PUBLICATIONS

International Search Report PCT/ISA/210 and Written Opinion PCT/ISA/237 for International Application PCT/KR2019/009066 dated Jul. 23, 2019.

(Continued)

*Primary Examiner* — Peter J Macchiarolo
*Assistant Examiner* — John M Royston
(74) *Attorney, Agent, or Firm* — Pearne & Gordon LLP

(57) ABSTRACT

Disclosed is a force sensor. More particularly, the force sensor includes a first permanent magnet layer; a magnetic tunnel junction disposed on the first permanent magnet layer and configured to have a preset resistance value; and a second permanent magnet layer disposed to be spaced apart from the magnetic tunnel junction, wherein the second permanent magnet layer moves in a direction of the first permanent magnet layer when pressure is applied from outside, the preset resistance value of the magnetic tunnel junction is changed when a magnetic field strength formed between the first permanent magnet layer and the second permanent magnet layer becomes a preset strength or more (Continued)

according to movement of the second permanent magnet layer, and the force sensor senses the pressure based on a change in the preset resistance value.

14 Claims, 10 Drawing Sheets

(56) References Cited

U.S. PATENT DOCUMENTS

2016/0146686 A1    5/2016   Curcic
2019/0041277 A1    2/2019   Elangovan et al.

OTHER PUBLICATIONS

Korean Office Action dated Mar. 13, 2020.
Korean Notice of Allowance dated Aug. 26, 2020.

* cited by examiner

[FIG. 1A]
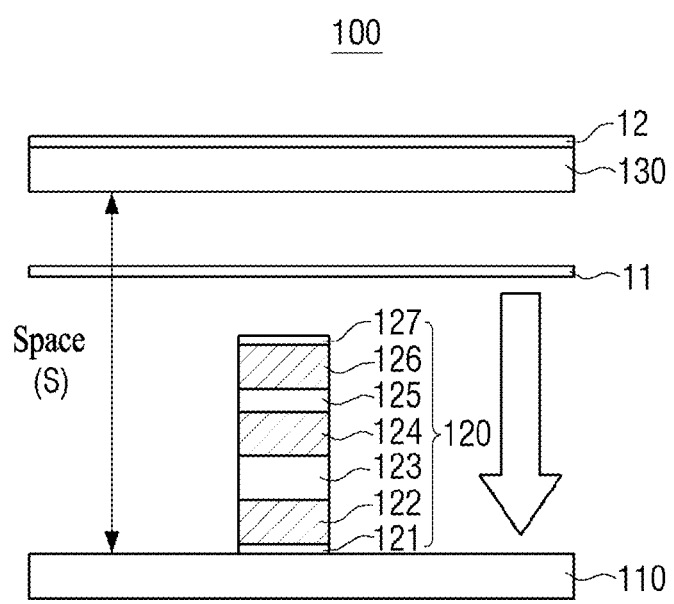

[FIG. 1B]
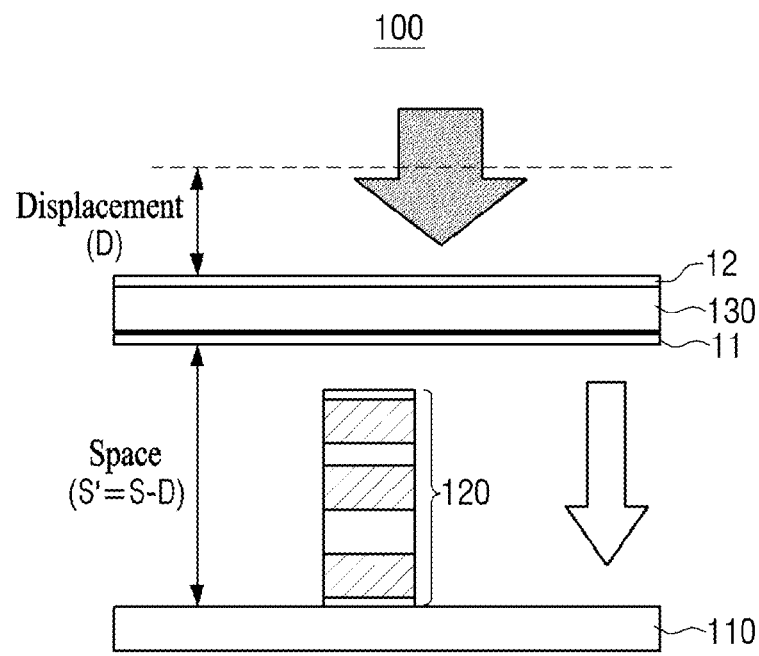
[FIG. 1C]
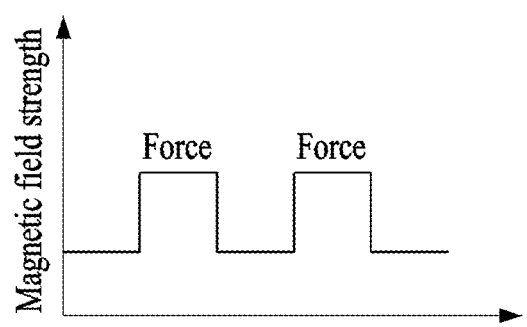

[FIG. 2A]
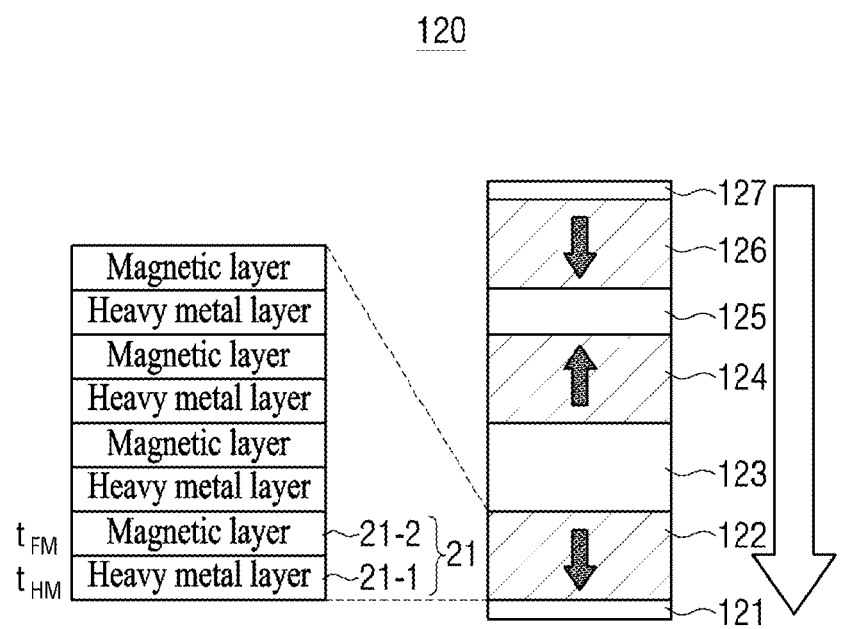

[FIG. 2B]
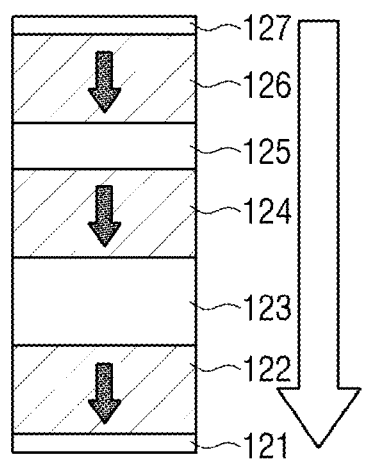

[FIG. 3A]
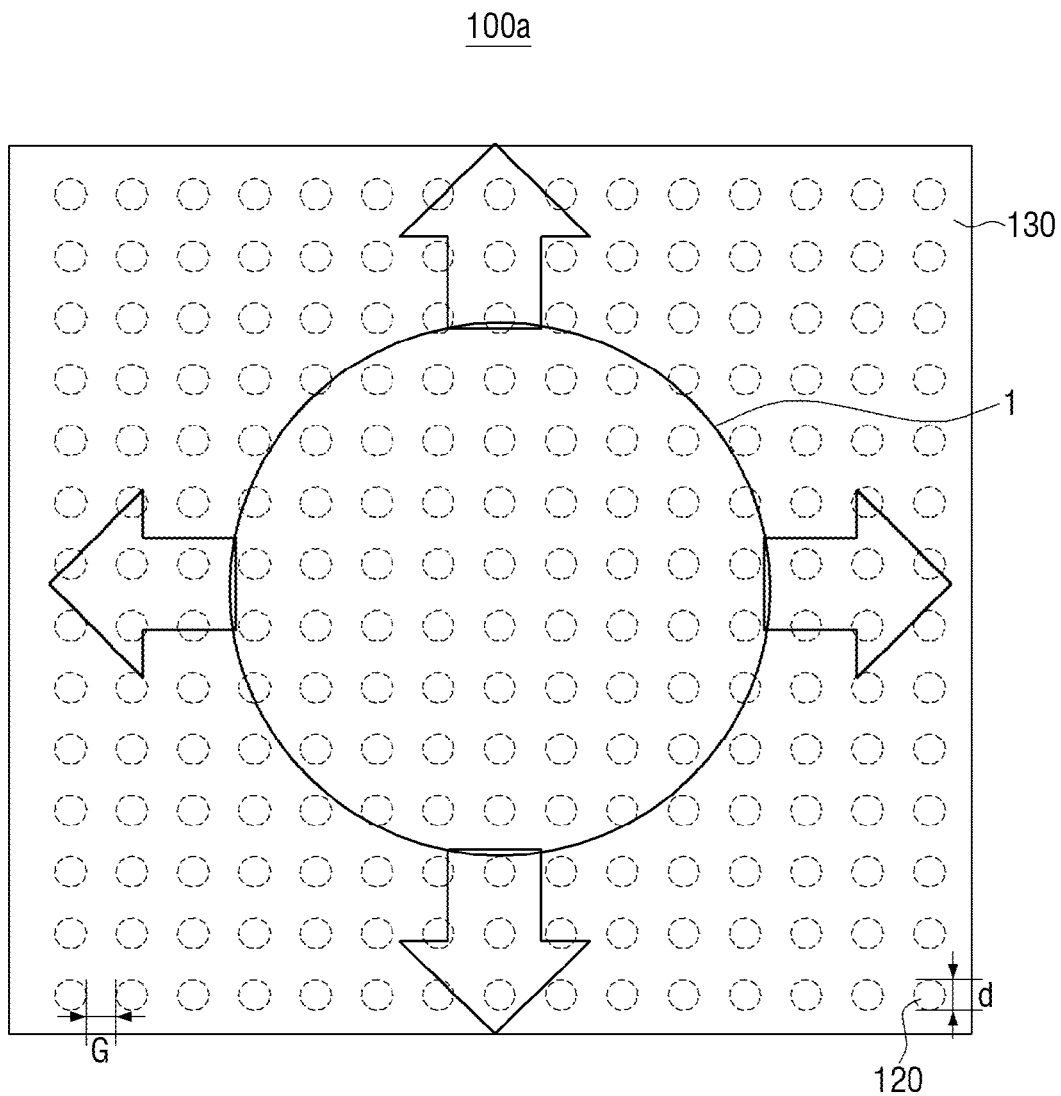

[FIG. 3B]
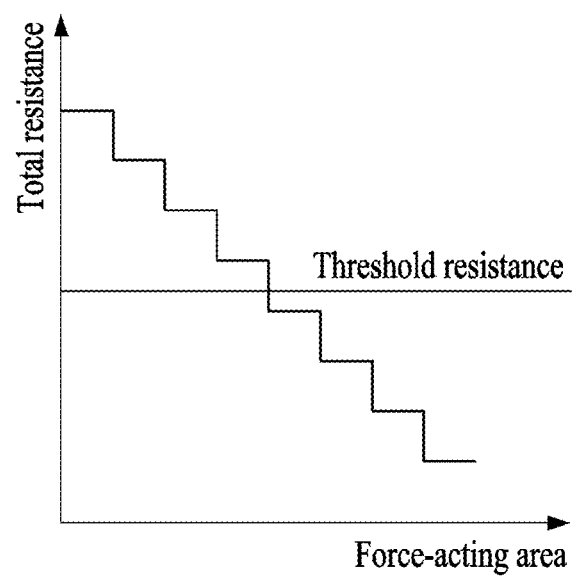

[FIG. 4A]
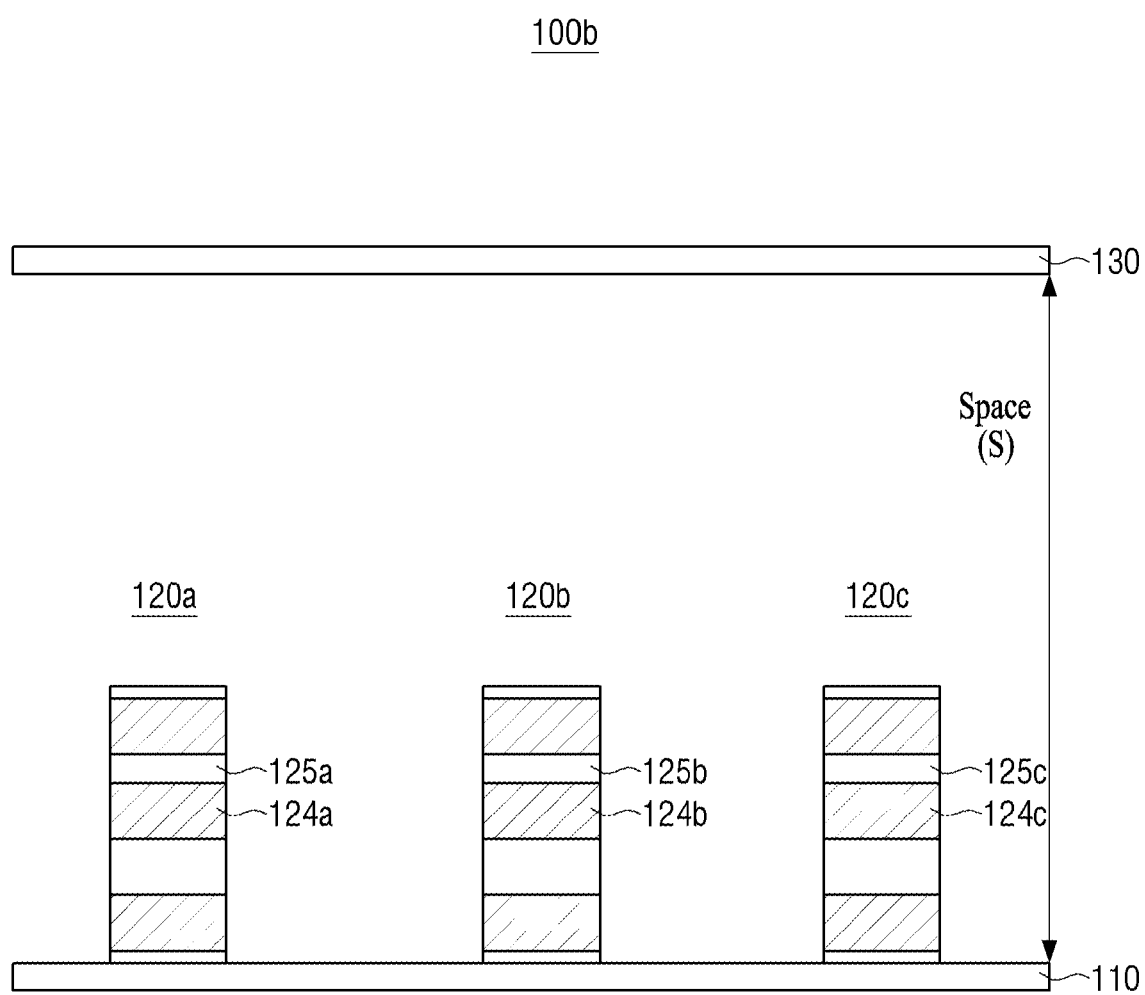

[FIG. 4B]
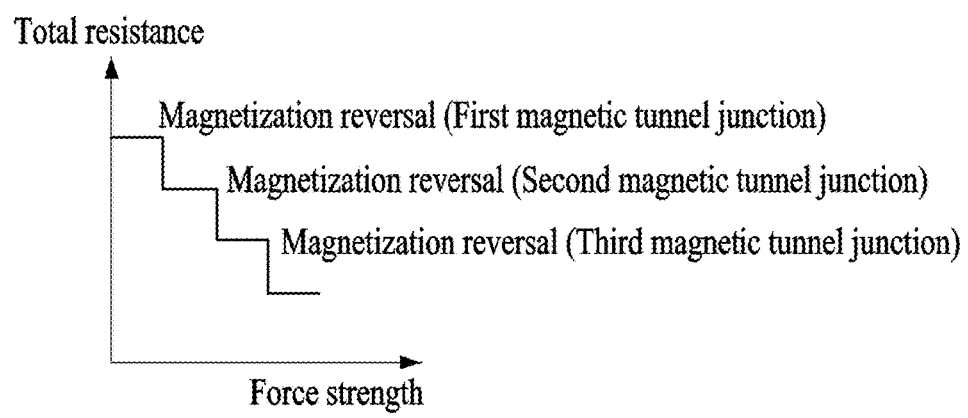
[FIG. 5A]
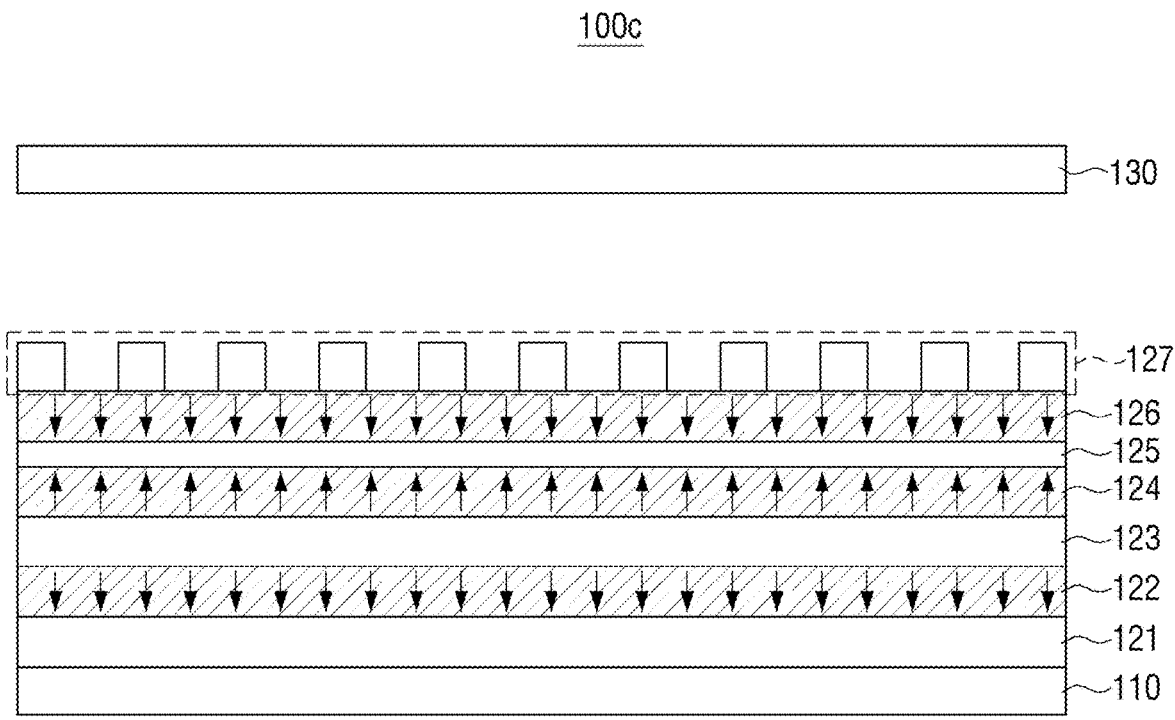

[FIG. 5B]
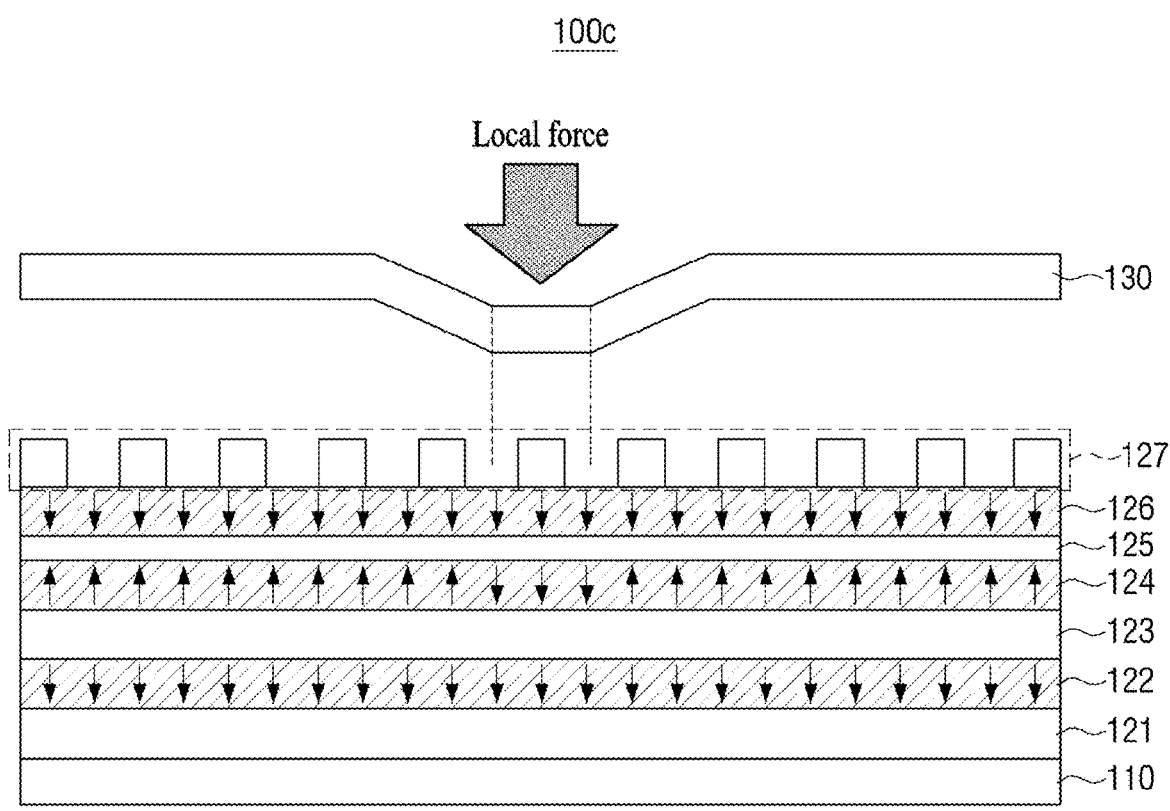

[FIG. 6A]
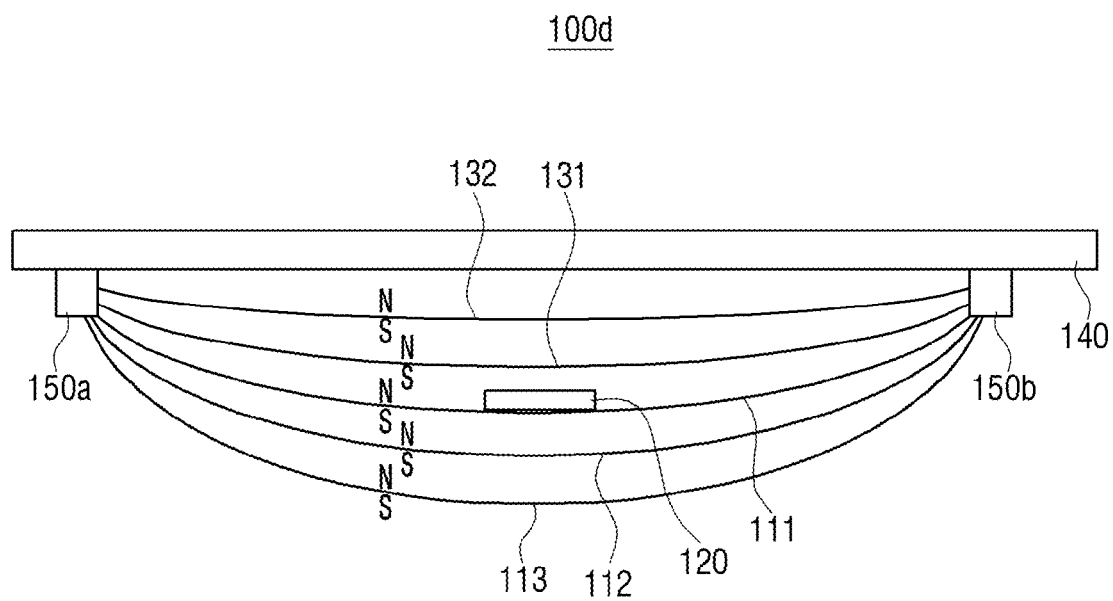
[FIG. 6B]
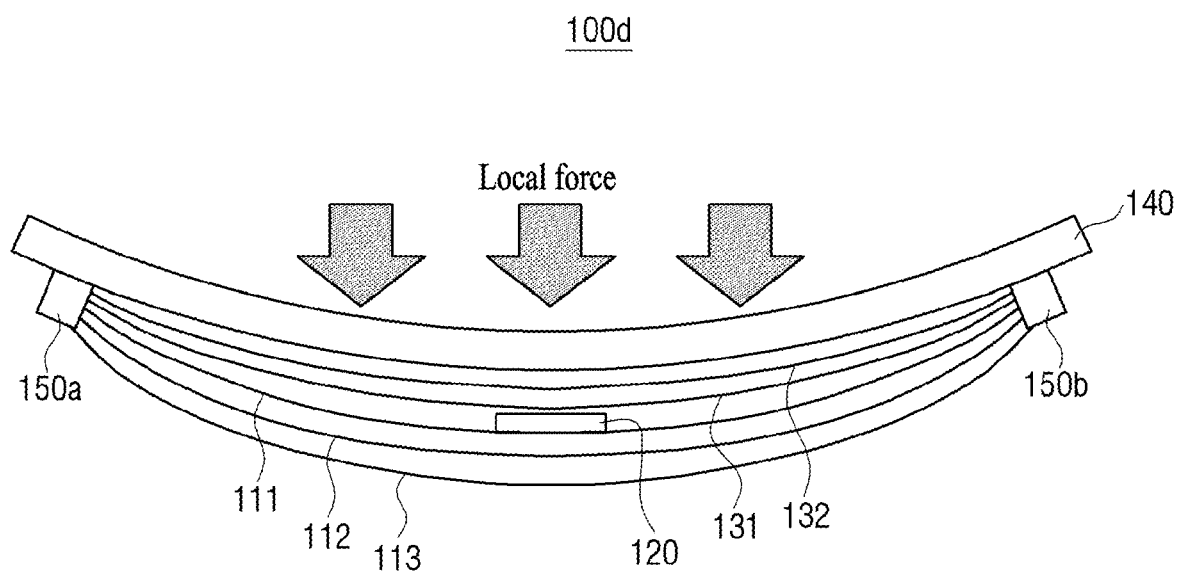

FORCE SENSOR

CROSS-REFERENCE TO RELATED APPLICATION

This application is a National Stage Entry of PCT International Application No. PCT/KR2019/009066, which was filed on Jul. 23, 2019, and which claims priority to Korean Patent Application No. 10-2019-0048304, filed on Apr. 25, 2019 in the Korean Intellectual Property Office, the disclosure of which is incorporated herein by reference.

TECHNICAL FIELD

The present invention relates to a force sensor, and more particularly to a force configured to measure force according to a change in the strength of a magnetic field.

BACKGROUND ART

In general, force sensors have been implemented using a strain gauge, a capacitive force sensor, conductive rubber, etc. Existing force sensors use the deformation of members, thereby requiring securement of a sufficient amount of deformation to realize high sensitivity and wide dynamic ranges. Accordingly, existing force sensors have limitations in miniaturizing the same, and are inconvenient in that they require strong force.

In recent years, interest in a miniaturized force sensor for replacing external buttons in smart phones, etc. is increasing, and research on force sensors using piezoelectric materials is being conducted. However, since force sensors fabricated using piezoelectric bimorph materials have a structure wherein two piezoelectric elements are tied together, there are disadvantages in miniaturizing the force sensors. In addition, a force sensor configured to control a frequency by detecting a phase angle difference between voltages applied to the piezoelectric bimorph materials requires a separate circuit for detecting phases, so that a circuit becomes complicated. In addition, force sensors manufactured using a piezoelectric material have a high possibility of errors when used as external buttons.

Therefore, there is a need for a force sensor that is capable of accurately sensing force when appropriate force is applied.

The research was supported by the Daegu Gyeongbuk Institute of Science & Technology (DGIST) Division of Nanotechnology (Grant Number: 2021010102) for the study on the principle of expression of next-generation nonvolatile memory resistance funded by the Ministry of Science and ICT (MSIT).

The research was supported by the Daegu Gyeongbuk Institute of Science & Technology (DGIST) Division of Nanotechnology (Grant Number: 2019030013) for development of ultra-low power artificial intelligence device with linear resistance change funded by the Ministry of Education (MOE).

DISCLOSURE

Technical Problem

Therefore, the present invention has been made in view of the above problems, and it is one object of the present invention to provide a force sensor configured to measure an applied force of a certain strength or more.

Technical Solution

In accordance with an aspect of the present invention, the above and other objects can be accomplished by the provision of a force sensor, including: a first permanent magnet layer; a magnetic tunnel junction disposed on the first permanent magnet layer and configured to have a preset resistance value; and a second permanent magnet layer disposed to be spaced apart from the magnetic tunnel junction, wherein the second permanent magnet layer moves in a direction of the first permanent magnet layer pressure is applied from outside, the preset resistance value of the magnetic tunnel junction is changed when a magnetic field strength formed between the first permanent magnet layer and the second permanent magnet layer becomes a preset strength or more according to movement of the second permanent magnet layer, and the force sensor senses the pressure based on a change in the preset resistance value.

Meanwhile, the magnetic tunnel junction may include a first electrode layer disposed on the first permanent magnet layer; a first perpendicular magnetic layer disposed on the first electrode layer and magnetized in a first direction; a tunnel layer disposed on the first perpendicular magnetic layer; a second perpendicular magnetic layer disposed on the tunnel layer and magnetized in a second direction opposite to the first direction; an insertion layer disposed on the second perpendicular magnetic layer; a third perpendicular magnetic layer disposed on the insertion layer and magnetized in the first direction; and a second electrode layer disposed on the third perpendicular magnetic layer.

In addition, a magnetization direction of the second perpendicular magnetic layer may be changed to the first direction when a magnetic field strength formed between the first permanent magnet layer and the second permanent magnet layer becomes a preset strength or more.

In addition, the first to third perpendicular magnetic layers may include a plurality of stacked bodies, wherein a magnetic layer is disposed on a heavy metal layer of the stacked bodies.

In addition, the first to third perpendicular magnetic layers may include an alloy of a heavy metal material and a magnetic material.

In addition, the heavy metal layer may include at least one of hafnium, tantalum, tungsten, rhenium, osmium, iridium, platinum and gold.

In addition, the magnetic layer may include at least one of iron, cobalt or nickel as a single material; an alloy including the single material components; and a cobalt-iron-boron alloy.

Meanwhile, the second permanent magnet layer may move to an initial position when pressure applied from the outside is removed, the magnetic field strength formed between the first permanent magnet layer and the second permanent magnet layer may be restored to an initially set strength, and the changed resistance value of the magnetic tunnel junction may be restored to the preset resistance value.

In addition, the force sensor may further include a stopper layer disposed between the second permanent magnet layer and the magnetic tunnel junction and configured to restrict movement of the second permanent magnet layer in a direction of the first permanent magnet layer.

In addition, the first permanent magnet layer and the second permanent magnet layer may be formed in a surface shape, a plurality of magnetic tunnel junctions may be disposed to be spaced apart from each other by a preset space on the first permanent magnet layer, a partial region, to which pressure is applied from outside, the second permanent magnet layer may, move in a direction of the first permanent magnet layer, and, when a magnetic field strength formed between a partial region of the second permanent magnet layer and the first permanent magnet layer is formed to a preset strength or more according to movement of the partial region of the second permanent magnet layer, the magnetic tunnel junctions may sense the pressure based on a total resistance value, which includes a changed resistance value of at least one magnetic tunnel junction corresponding to the partial region of the second permanent magnet layer, of the magnetic tunnel junctions and a preset threshold resistance value.

In addition, a plurality of magnetic tunnel junctions may be disposed on the first permanent magnet layer.

The respective magnetic tunnel junctions may sense the pressure in stages due to differently formed magnetic field strength according to a change in the preset resistance value.

Meanwhile, the first permanent magnet layer, the second permanent magnet layer and the magnetic tunnel junction may be formed in a surface shape, a partial region, to which pressure is applied from outside, the second permanent magnet layer may move in a direction of the first permanent magnet layer, and, when a magnetic field strength formed between a partial region of the second permanent magnet layer and the first permanent magnet layer is formed to a preset strength or more according to movement of the partial region of the second permanent magnet layer, the magnetic tunnel junction may sense the pressure and an area, to which the pressure is applied, based on a total resistance value, which includes a changed resistance value of a partial region of the magnetic tunnel junction corresponding to the partial region of the second permanent magnet layer, of the magnetic tunnel junction.

In addition, a first electrode layer and a second electrode layer may be respectively included in top and bottom portions of the magnetic tunnel junction, and one electrode layer of the first and second electrode layers may be formed in an array form and another electrode layer thereof is formed in a thin membrane shape.

Meanwhile, a space between the first permanent magnet layer and the second permanent magnet layer may be 10 nm to 1 cm.

In accordance with another aspect of the present invention, there is provided a force sensor, including: a support layer having elasticity; a plurality of permanent magnet layers including a first permanent magnet layer; and a second permanent magnet layer disposed on first permanent magnet layer such that a central region between the first permanent magnet layer and the second permanent magnet layer is spaced; and a magnetic tunnel junction disposed on the central region of the first permanent magnet layer and configured to have a preset resistance value; and fixation members disposed on opposite ends of a lower part of the support layer to fix opposite ends of the permanent magnet layers, wherein each of the permanent magnet layers is formed in a thin membrane shape, a partial region, to which pressure is applied from outside, of the support layer moves in a direction of the permanent magnet layers, opposite ends, on which the fixation members are disposed, of the support layer move in a direction opposite to the direction, spaces of the central regions of the permanent magnet layers are reduced according movement to the support layer, magnetic field strength formed at the central regions is formed to a preset strength or more as the spaces are reduced, the preset resistance value of the magnetic tunnel junction is changed by the magnetic field strength formed to the preset strength or more, and the pressure is sensed based on a change in the preset resistance value.

Advantageous Effects

As apparent from the above description, various embodiments of a force sensor according to the present disclosure can accurately measure force when a force of a certain strength or more is applied.

In addition, the force sensor can be set in various ways to measure force when required pressure is applied.

In addition, the force sensor can measure applied force in stages and can measure an area to which the force is applied.

Effects of the present invention are not limited to the effects mentioned above, and other effects not mentioned will be clearly understood by those skilled in the art from the following description.

DESCRIPTION OF DRAWINGS

FIG. 1A illustrates a force sensor according to an embodiment of the present disclosure.

FIG. 1B illustrates a force sensor according to an embodiment of the present disclosure to which pressure is applied.

FIG. 1C illustrates a pressure-dependent magnetic field strength in a force sensor according to an embodiment of the present disclosure.

FIG. 2A illustrates a magnetic tunnel junction according to an embodiment of the present disclosure.

FIG. 2B illustrates a magnetic tunnel junction according to an embodiment of the present disclosure to which pressure is applied.

FIG. 3A illustrates a force sensor on which magnetic tunnel junctions according to an embodiment of the present disclosure are arranged.

FIG. 3B is a graph illustrating the relationship between a force-acting area and a resistance in a force sensor on which magnetic tunnel junctions according to an embodiment of the present disclosure are arranged.

FIG. 4A illustrates a force sensor configured to measure force in stages according to an embodiment of the present disclosure.

FIG. 4B is a graph illustrating the relationship between force strength and resistance in a force sensor configured to measure force in stages.

FIG. 5A illustrates a force sensor implemented in the form of a film.

FIG. 5B illustrated a film-type force sensor to which pressure is applied.

FIG. 6A illustrates a force sensor including thin film-type permanent magnets.

FIG. 6B illustrates a force sensor including thin film-type permanent magnets to which pressure is applied.

BEST MODE

Hereinafter, various embodiments will be described in more detail with reference to the accompanying drawings. The embodiments described herein may be variously modified. Certain embodiments may be depicted in the drawings and described in detail in the detailed description. However, the specific embodiments disclosed in the accompanying drawings are only provided to facilitate understanding of various embodiments. Therefore, it should be understood that the technical spirit is not limited by specific embodiments described in the accompanying drawings and all equivalents or substitutes are included in the spirit and scope of the invention.

It will be understood that, although the terms first, second, third etc. may be used herein to describe various elements, these elements should not be limited by these terms. These terms are only used to distinguish one element from another element.

In the present specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. It will be understood that when an element is referred to as being "connected to" or "coupled to" another element, it may be directly connected or coupled to the other element or intervening elements may be present. In contrast, when an element is referred to as being "directly connected to" or "directly coupled to" another element or layer, there are no intervening elements or layers present.

In the present specification, only essential components necessary for the description of the present invention are described, and components not related to the essence of the present invention are not mentioned. In addition, it should not be construed in an exclusive meaning that components mentioned are only included, but it should be construed in a non-exclusive meaning that other components are also included.

In the following description of the present invention, a detailed description of known functions and configurations incorporated herein will be abbreviated or omitted when it may make the subject matter of the present invention unclear. Meanwhile, each embodiment may be implemented or operated independently, or respective embodiments may be implemented or operated in a combined form.

FIG. 1A illustrates a force sensor according to an embodiment of the present disclosure, FIG. 1B illustrates a force sensor according to an embodiment of the present disclosure to which pressure is applied, and FIG. 1C illustrates a pressure-dependent magnetic field strength in a force sensor according to an embodiment of the present disclosure. The structure and operation of a force sensor according to an embodiment of the present disclosure will be described with reference to FIGS. 1a to 1c.

Referring to FIG. 1A, a force sensor 100 may include a first permanent magnet layer 110, a magnetic tunnel junction 120 and a second permanent magnet layer 130.

The first permanent magnet layer 110 may be disposed on the bottom of the force sensor 100, and the magnetic tunnel junction 120 may be disposed on the first permanent magnet layer 110. For example, the magnetic tunnel junction 120 may include a first electrode layer 121, a first perpendicular magnetic layer 122, a tunnel layer 123, a second perpendicular magnetic layer 124, an insertion layer 125, a third perpendicular magnetic layer 126 and a second electrode layer 127 from below. The magnetic tunnel junction 120 may have a constant resistance value in a normal state.

The second permanent magnet layer 130 may be disposed to be spaced apart from the magnetic tunnel junction 120 by a predetermined space. The second permanent magnet layer 130 and the first permanent magnet layer 110 may be respectively disposed on the top and bottom of the force sensor 100 to face each other, and the second permanent magnet layer 130 may maintain a constant space S from the first permanent magnet layer 110. In an embodiment, a space between the second permanent magnet layer 130 and the first permanent magnet layer 110 may be about 10 nm to 1 cm. A magnetic field may be formed between the second permanent magnet layer 130 and the first permanent magnet layer 110. In an embodiment, the magnetic field may be formed in a direction (vertical direction) from the second permanent magnet layer 130 to the first permanent magnet layer 110.

The second permanent magnet layer 130 may move toward the first permanent magnet layer 110 (or toward the magnetic tunnel junction 120) by pressure (force) applied from the outside. FIG. 1B illustrates the force sensor 100 in a pressurized state.

When the second permanent magnet layer 130 moves toward the first permanent magnet layer 110 by pressure applied from the outside, a space between the second permanent magnet layer 130 and the first permanent magnet layer 110 may be reduced. For example, when the second permanent magnet layer 130 moves by a certain displacement D by pressure, a space S' between the second permanent magnet layer 130 and the first permanent magnet layer 110 may be a value obtained by subtracting the displacement D from an initial space S. Accordingly, the magnetic field strength formed between the second permanent magnet layer 130 and the first permanent magnet layer 110 may be increased.

When the strength of magnetic field is greater than or equal to a certain strength, a resistance value of the magnetic tunnel junction 120 may be changed. A change process of the resistance value of the magnetic tunnel junction 120 according to the magnetic field strength will be described below. For example, the resistance value of the magnetic tunnel junction 120 may be relatively large in an initial state, and, when the magnetic field strength is formed to be greater than or equal to a certain strength, the resistance value of the magnetic tunnel junction 120 may be changed to a relatively small value. The force sensor 100 may sense applied pressure based on a changed value of the resistance value of the magnetic tunnel junction 120 according to a change in the magnetic field strength.

Meanwhile, the stopper layer 11 may be additionally formed between the second permanent magnet layer 130 and the magnetic tunnel junction 120. The stopper layer 11 may serve to limit movement of the second permanent magnet layer 130 in the direction of the first permanent magnet layer 110. Since the stopper layer 11 may serve to limit the movement of the second permanent magnet layer 130, damage to the magnetic tunnel junction 120 may be prevented even when excessive pressure is applied from the outside, and malfunction of the force sensor 100 due to excessive magnetic field changes may be prevented. That is, the stopper layer 11 serves to fix the displacement D of the second permanent magnet layer 130 to limit a magnetic field change to two steps, thereby being capable of improving the reliability of sensor operation.

In addition, a cover layer 12 may be further formed on the second permanent magnet layer 130. The cover layer 12 may include a material with restoring force and a constant strength and may be attached to an upper portion of the second permanent magnet layer 130. Since the cover layer 12 has restoring force, the cover layer 12 may restore the second permanent magnet layer 130 to an original position thereof when pressure applied from the outside is removed. In addition, the cover layer 12 may prevent damage to the second permanent magnet layer 130 due to pressure applied from the outside.

The second permanent magnet layer 130 may move to an initial position thereof when pressure applied from the outside is removed. When the second permanent magnet layer 130 moves to the initial position, a magnetic field strength formed between the second permanent magnet layer 130 and the first permanent magnet layer 110 may also be restored to an initially set strength. When the magnetic field strength is restored to the initially set strength, the changed resistance value of the magnetic tunnel junction may also be restored to an initial constant resistance value. Accordingly, when pressure applied from the outside is removed, the force sensor 100 may sense the pressure-removed state.

FIG. 1C illustrates the pressure-dependent magnetic field strength of the force sensor 100. As described above, a constant magnetic field may be formed between the second permanent magnet layer 130 and the first permanent magnet layer 110. When pressure is applied from the outside, a formed magnetic field strength may increase. On the other hand, when the applied pressure is removed, the increased magnetic field strength may be decreased.

FIG. 2A illustrates a magnetic tunnel junction according to an embodiment of the present disclosure, and FIG. 2B illustrates a magnetic tunnel junction according to an embodiment of the present disclosure to which pressure is applied. A detailed configuration and operation of the magnetic tunnel junction 120 are described with reference to FIGS. 2A and 2B.

Referring to FIG. 2A, the magnetic tunnel junction 120 under a constant magnetic field strength or less is illustrated. As described above, the magnetic tunnel junction 120 may include the first electrode layer 121, the first perpendicular magnetic layer 122, the tunnel layer 123, the second perpendicular magnetic layer 124, the insertion layer 125, the third perpendicular magnetic layer 126 and the second electrode layer 127 form below. Magnetization directions of the first perpendicular magnetic layer 122 and the third perpendicular magnetic layer 126 may be a first direction the same as a magnetic field direction of the force sensor. A magnetization direction of the second perpendicular magnetic layer 124 may be a second direction opposite to the first direction. Since the magnetization directions of the first perpendicular magnetic layer 122 and the third perpendicular magnetic layer 126 are opposite to the magnetization direction of the second perpendicular magnetic layer 124 under a constant magnetic field strength or less, the magnetic tunnel junction 120 may have a relatively high resistance value. The resistance value of the magnetic tunnel junction 120 may be measured using a spin polarized current passing through the tunnel layer. That is, the resistance value of the magnetic tunnel junction 120 may be measured based on a current value between the first electrode layer 121 and the second electrode layer 127.

The insertion layer 125 between the second perpendicular magnetic layer 124 and the third perpendicular magnetic layer 126 may make the magnetization directions of the second perpendicular magnetic layer 124 and the third perpendicular magnetic layer 126 to be parallel or antiparallel based on interlayer exchange coupling or Ruderman-Kittel-Kasuya-Yosida (RKKY) interaction and thickness.

For example, the insertion layer may include a material such as vanadium (V), chromium (Cr), manganese (Mn), copper (Cu), niobium (Nb), molybdenum (Mo), technetium (Tc), ruthenium (Ru), rhodium (Rh), tantalum (Ta), tungsten (W), rhenium (Re), osmium (Os), iridium (Ir), or the like. In addition, the tunnel layer may be a dielectric including MgO, or the like and may have a thickness of about 0.9 nm to 1.1 nm.

The first perpendicular magnetic layer 122 may include a plurality of stacked bodies 21 including heavy metal layers (21-1) with a first preset thickness (t HM) and magnetic layers (21-2) with a second preset thickness (t FM). That is, the first perpendicular magnetic layer 122 may include a multilayer thin film layer including a thin-film heavy metal material layer and a thin-film magnetic material layer. Alternatively, the first perpendicular magnetic layer 122 may include an alloy of a heavy metal material and a magnetic material.

For example, the heavy metal material (or heavy metal layer) may include hafnium (Hf), tantalum (Ta), tungsten (W), rhenium (Re), osmium (Os), iridium (Ir), platinum (Pt), gold (Au), or the like, and the magnetic material (or magnetic layer) may include a single material such as iron (Fe), cobalt (Co) or nickel (Ni); an alloy including these single materials; a cobalt-iron-boron (Co—Fe—B) alloy; or the like. The thickness (t HM) of the heavy metal layer and the thickness (t FM) of the magnetic layer may be respectively about 0.1 nm to 10 nm.

The second perpendicular magnetic layer 124 and the third perpendicular magnetic layer 126 may be implemented in the same manner and structure as those of the first perpendicular magnetic layer 122. The first to third perpendicular magnetic layers 122, 124 and 126 may have perpendicular magnetic anisotropy. Meanwhile, the first perpendicular magnetic layer 122 and the third perpendicular magnetic layer 126 have strong perpendicular magnetic anisotropy, so that the magnetization directions thereof are not reversed by the magnetic field that is formed by the first and second permanent magnet layers 110 and 130 of the force sensor 100. The perpendicular magnetic anisotropy of the first and third perpendicular magnetic layers 122 and 126 may be implemented to have necessary strength depending upon the thicknesses of the heavy metal layer and the magnetic layer (or the thickness of heavy metal material-magnetic material alloy), materials constituting the heavy metal layer and the magnetic layer (alloy material), or the number of stacked bodies formed by laminating the heavy metal layer and the magnetic layer. In addition, the perpendicular magnetic anisotropy strength of the second perpendicular magnetic layer 124 may be implemented to allow the magnetization direction to be reversed by an appropriate magnetic field strength.

When pressure is applied to the second permanent magnet layer 130, the second permanent magnet layer 130 may move toward the first permanent magnet layer 110. Accordingly, the magnetic field strength between the second permanent magnet layer 130 and the first permanent magnet layer 110 may be increased.

As shown in FIG. 2B, when the magnetic field strength is greater than or equal to a certain strength at which the magnetization direction of the second perpendicular magnetic layer 124 can be reversed, the magnetization direction of the second perpendicular magnetic layer 124 may be reversed. When the magnetization direction of the second perpendicular magnetic layer 124 is reversed, the magnetization directions of the first perpendicular magnetic layer 122 and the second perpendicular magnetic layer 124 may become parallel, and the magnetic tunnel junction 120 may become a relatively low resistance state. Accordingly, the force sensor 100 may sense pressure, applied from the outside, based on a resistance value change in the magnetic tunnel junction 120.

When pressure from the outside is removed, the second permanent magnet layer 130 may be restored to the original position thereof by restoring force. As the space between the second permanent magnet layer 130 and the first permanent magnet layer 110 is restored to the original space, the magnetic field strength may be reduced. In addition, as the magnetization direction of the second perpendicular magnetic layer 124 is also restored to the original direction, the magnetization direction of the second perpendicular magnetic layer 124 may become antiparallel to the magnetization directions of the first and third perpendicular magnetic layers 122 and 126. Accordingly, the magnetic tunnel junction 120 may be restored to the initial state thereof, i.e., a high resistance state, again. In an embodiment, a resistance in a low resistance state may be about 300Ω to 1 kΩ, and a resistance in a high resistance state may be about 1 kΩ to 3 kΩ.

Meanwhile, a force sensor may be implemented in various structures.

FIG. 3A illustrates a force sensor on which magnetic tunnel junctions according to an embodiment of the present disclosure are arranged, and FIG. 3B is a graph illustrating the relationship between a force-acting area and a resistance in a force sensor on which magnetic tunnel junctions according to an embodiment of the present disclosure are arranged. The force sensor on which the magnetic tunnel junctions are arranged is described with reference to FIGS. 3A and 3B.

FIG. 3A illustrates a top view of the force sensor on which the magnetic tunnel junctions are arranged. A basic structure of the force sensor is similar to the structure illustrated in FIG. 1. Here, a force sensor 100a on which the magnetic tunnel junctions are arranged may include a plurality of magnetic tunnel junctions 120 arranged at preset spaces. In an embodiment, the diameter (d) of each of the magnetic tunnel junctions 120 may be about 10 nm to 100 um, a space (G) between the magnetic tunnel junctions 120 may be about 10 nm to 1 cm.

In addition, the first permanent magnet layer 110 and the second permanent magnet layer 130 may be formed in the form of a surface such that a magnetic field can be formed in all of the magnetic tunnel junctions 120. Similar to the above, pressure from the outside may be applied to the second permanent magnet layer 130. Since the second permanent magnet layer 130 is formed in the form of a surface, pressure may be applied to a partial region of the second permanent magnet layer 130. In addition, a partial region 1 of the second permanent magnet layer 130 to which the pressure 1 is applied may move in the direction of the first permanent magnet layer 110.

As a partial region of the second permanent magnet layer 130 moves, the magnetic field strength of a region corresponding thereto may increase. In addition, resistance values of one or more magnetic tunnel junctions 120, which are located at a region at which the magnetic field strength increases, among the magnetic tunnel junctions 120 may be changed. In addition, resistance values of the remaining magnetic tunnel junctions 120 may maintain the initial state (a high resistance state). That is, a total resistance value of the force sensor 100a on which the magnetic tunnel junctions are arranged may be sequentially decreased as a region to which pressure is applied increases. The force sensor 100a may sense pressure applied from the outside based on a total resistance value and a preset threshold resistance value. In addition, the force sensor 100a may sense a region, to which pressure is applied, based on the number and positions of the magnetic tunnel junctions whose resistance values are changed.

FIG. 3B illustrates the relationship between the total resistance of the force sensor 100a and a region of the force sensor 100a to which pressure is applied. As the number of the magnetic tunnel junctions 120 whose resistance values are changed increases, the total resistance value of the force sensor 100a may be decreased in stages. When the total resistance value becomes the preset threshold resistance or less, the force sensor 100a may sense that pressure is applied. In addition, a processor (not shown) serving to receive a pressure-sensing signal from the force sensor 100a may perform an operation corresponding to the pressure-sensing signal. Meanwhile, a plurality of threshold resistance values may be set. In an embodiment, when the total resistance value is decreased in stages, such as 10 kΩ, 9 kΩ, 8 kΩ, . . . , 3 kΩ, according to pressure applied from the outside, threshold resistance values may be set to values such as 8.5 kΩ, 6.5 kΩ and 4.5 kΩ. In addition, a terminal device (not shown) including the force sensor 100a may be set to perform a preset first operation when the total resistance value becomes 8.5 kΩ or less, to perform a preset second operation when the total resistance value becomes 6.5 kΩ or less, and to perform a preset third operation when the total resistance value becomes 4.5 kΩ or less.

In addition, the pressure applied to the force sensor 100a may move in any directions (arrow directions of FIG. 3A) as shown in FIG. 3A. As the region to which pressure is applied moves, resistance values of some magnetic tunnel junctions whose resistance values are changed may be restored to an initial resistance value, and resistance values of some magnetic tunnel junctions that maintain an initial resistance value may be changed. As resistance values of the respective magnetic tunnel junctions 120 are changed, the force sensor 100a may sense whether a position to which pressure is applied is moved; and the speed of the movement.

FIG. 4A illustrates a force sensor configured to measure force in stages according to an embodiment of the present disclosure, and FIG. 4B is a graph illustrating the relationship between force strength and resistance in a force sensor configured to measure force in stages. The force sensor configured to measure force in stages will be described with reference to FIGS. 4A and 4B.

FIG. 4A illustrates a force sensor 100b including a first permanent magnet layer 110; and a plurality of magnetic tunnel junctions 120a, 120b and 120c arranged thereon. Respective magnetization directions of second perpendicular magnetic layers 124a, 124b and 124c of the magnetic tunnel junctions 120a, 120b and 120c may be changed under different magnetic field strengths. For example, the magnetic field strengths, where magnetization directions are changed, of the respective magnetic tunnel junctions 120a, 120b and 120c may be implemented depending upon materials or thicknesses of the respective insertion layers 125a, 125b and 125c or materials or thicknesses of the respective second perpendicular magnetic layers 124a, 124b and 124c.

For example, as shown in FIG. 4A, the force sensor 100b including the magnetic tunnel junctions 120a, 120b and 120c whose magnetization directions are changed at different magnetic field strengths may become a low resistance state because the magnetization direction of the first magnetic tunnel junction 120a is changed when the second permanent magnet layer 130 moves by a first distance based on an initial position in the direction of the first permanent magnet layer 110. In addition, when the second permanent magnet layer 130 moves by a second distance, which is farther than the first distance, in the direction of the first permanent magnet layer 110, the magnetization direction of the second magnetic tunnel junction 120b is changed, resulting in a low resistance state. The first magnetic tunnel junction 120a in a low resistance state may maintain the low resistance state. When the second permanent magnet layer 130 moves by a third distance, which is farther than the second distance, in the direction of the first permanent magnet layer 110, the magnetization direction of the third magnetic tunnel junction 120c is changed, resulting in a low resistance state. The first and second magnetic tunnel junctions 120a and 120b in a low resistance state may maintain the low resistance state.

As a result, as shown in FIG. 4B, resistance values of the magnetic tunnel junctions 120a, 120b and 120c, whose magnetization directions are changed at different magnetic field strengths, included in the force sensor 100b may be sequentially changed according to pressure applied to the second permanent magnet layer 130. In addition, a total resistance value of the force sensor 100b may be changed in stages according to the sequentially changed resistance values of the magnetic tunnel junctions 120a, 120b and 120c, and pressure may be sensed in stages based on the total resistance value changed in stages. Accordingly, the force sensor 100b may precisely distinguish the strength of pressure.

FIG. 5A illustrates a force sensor implemented in the form of a film, and FIG. 5B illustrated a film-type force sensor to which pressure is applied. The force sensor implemented in the form of a film will be described with reference to FIGS. 5A and 5B.

FIG. 5A illustrates a force sensor 100c implemented in the form of a film (thin membrane). The configuration of the force sensor 100c implemented in the form of a film is the same as the configuration described above except that a first permanent magnet layer 110, a magnetic tunnel junction 120 and a second permanent magnet layer 130 are implemented in the form of a film (thin membrane) with a predetermined area. In addition, a first perpendicular magnetic layer 122, a tunnel layer 123, a second perpendicular magnetic layer 124, an insertion layer 125 and a third perpendicular magnetic layer 126 included in the magnetic tunnel junction 120 may also be implemented in the form of a film. Here, the first electrode layer 121 or the second electrode layer 127 may be implemented in the form of a film or in the shape wherein the first electrode layer 121 and the second electrode layer 127 are spaced apart from each other by a predetermined space. When the first electrode layer 121 or the second electrode layer 127 is implemented in an array form, the power consumption of the force sensor 100c may be reduced.

As shown in FIG. 5B, when pressure is applied to a partial region of the second permanent magnet layer 130, a magnetization direction of a partial region of the second perpendicular magnetic layer 124 which corresponds to the partial region to which pressure is applied may be changed. The force sensor 100c may sense pressure based on a total resistance value. In addition, a region, whose magnetization direction is changed, of the second perpendicular magnetic layer 124 may be changed according to a region, to which pressure is applied, of the second permanent magnet layer 130. The total resistance value of the force sensor 100c may be changed according to a region, whose magnetization direction is changed, of the second perpendicular magnetic layer 124. Accordingly, the force sensor 100c may sense pressure and may sense the strength or area of applied pressure.

Since most constructions of the force sensor implemented in the form of a film may be manufactured in a manner of laminating films (thin membranes), a process can be simplified and a process time and cost can be reduced.

The second permanent magnet layer 130 included in the force sensors according the various embodiments described above may be implemented as a member having elasticity. Accordingly, when pressure applied to the second permanent magnet layer 130 is removed, the second permanent magnet layer 130 may be restored to an original position thereof, and the magnetization direction of the second perpendicular magnetic layer may also be restored to the initial direction according to the restoration of the second permanent magnet layer 130. In addition, a stopper layer serving to restrict the movement of the second permanent magnet layer may be included under the second permanent magnet layer 130, and a cover layer may be attached to an upper part of the second permanent magnet layer 130.

FIG. 6A illustrates a force sensor including thin film-type permanent magnets, and FIG. 6B illustrates a force sensor including thin film-type permanent magnets to which pressure is applied.

Referring to FIG. 6A, a force sensor 100d may include a plurality of first permanent magnet layers 111, 112 and 113 with a thin membrane shape; a magnetic tunnel junction 120 disposed on the first permanent magnet layer 111 as one of the first permanent magnet layers 111, 112 and 113; a plurality of second permanent magnet layers 131 and 132; a support layer 140 having elasticity; and fixation members 150a and 150b for fixing the plural permanent magnet layers.

The force sensor 100d may include the plurality of first permanent magnet layers 111, 112 and 113 and second permanent magnet layers 131 and 132 which have elasticity and a thin membrane shape. The first permanent magnet layers 111, 112 and 113 and the second permanent magnet layers 131 and 132 may be connected and fixed to the fixation members 150a and 150b that are located at opposite ends of the support layer 140. Spaces between the first and second permanent magnet layers 111, 112, 113, 131 and 132 may be filled with air or a flexible member having elasticity.

The first and second permanent magnet layers 111, 112, 113, 131 and 132 may be implemented to have a constant space therebetween, and the magnetization directions thereof may be aligned in a constant direction as shown in FIG. 6A. Although FIG. 6A illustrates a total of five layers, i.e., the first and second permanent magnet layers 111, 112, 113, 131 and 132, the first and second permanent magnet layers may be implemented as two or more layers.

In addition, the magnetic tunnel junction 120 may be disposed on the permanent magnet layer 111 that is located in the middle of the first and second permanent magnet layers 111, 112, 113, 131 and 132. As described above, since the magnetization direction of the second perpendicular magnetic layer of the magnetic tunnel junction 120 is antiparallel (opposite direction) to the magnetization directions of the first and third perpendicular magnetic layers in an initial state, the force sensor 100d may be in a high resistance state. A basic operation of the force sensor 100d is similar to that described above.

As shown in FIG. 6B, pressure may be applied to the support layer 140. When pressure is applied to the support layer 140, a pressure application region of the support layer 140 moves in a direction in which pressure is applied, and the opposite ends thereof may move in opposite directions. As the opposite ends move, the fixation members 150a and 150b located at the opposite ends may also move in in a direction to which pressure is applied and in opposite directions, and spaces between the first and second permanent magnet layers 111, 112, 113, 131 and 132 may be reduced. Magnetic field strength to be applied to the magnetic tunnel junction 120 located at the middle region increases as spaces between the first and second permanent magnet layers 111, 112, 113, 131 and 132 are reduced, and when the magnetic field strength is greater than or equal to a certain strength, the resistance state of the magnetic tunnel junction 120 may be changed to a low resistance state while the magnetization direction of the second perpendicular magnetic layer of the magnetic tunnel junction 120 is changed. Accordingly, the force sensor 100d may sense pressure based on a resistance value change in the magnetic tunnel junction 120.

The force sensor 100d including the thin film-type permanent magnets does not require a stopper layer, and the strength of stray field generated from permanent magnet layers is reduced, so that influence on other elements can be minimized.

Various embodiments of the force sensor have been described above. The magnetic tunnel junction included in the force sensor of the present disclosure can be manufactured in a very small size of serval nanometers, and can reduce power consumption.

In addition, the force sensor of the present disclosure can replace sensors, such as protruding buttons (e.g., keyboard, mouse, power button, volume button), operated by all external forces as well as mobile phones and smart devices. In addition, when the force sensor of the present disclosure is applied, flexible input devices (e.g., keyboards, etc.) or buttons of smart devices can be built-in, and since the inside thereof can be completely sealed, it is effective in maintaining the waterproof function.

In addition, the permanent magnet layers constituting the upper and lower layers of the force sensor can shield electromagnetic waves from the outside.

Although preferred embodiments of the present invention have been illustrated and described, but the present invention is not limited to the specific embodiments. Various modifications can be made by those skilled in the art without departing from the gist of the present invention as claimed in the claims, and these modifications should not be understood separately from the spirit or idea of the present invention.

The invention claimed is:

1. A force sensor, comprising:
   a first permanent magnet layer;
   a magnetic tunnel junction disposed on the first permanent magnet layer and configured to have a preset resistance value; and
   a second permanent magnet layer disposed to be spaced apart from the magnetic tunnel junction,
   wherein the second permanent magnet layer moves in a direction of the first permanent magnet layer when a pressure is applied from outside, the preset resistance value of the magnetic tunnel junction is changed when a magnetic field strength formed between the first permanent magnet layer and the second permanent magnet layer becomes a preset strength or more according to a movement of the second permanent magnet layer, and the force sensor senses the pressure based on a change in the preset resistance value, and
   wherein the magnetic tunnel junction comprises a first electrode layer disposed on the first permanent magnet layer; a first perpendicular magnetic layer disposed on the first electrode layer and magnetized in a first direction; a tunnel layer disposed on the first perpendicular magnetic layer; a second perpendicular magnetic layer disposed on the tunnel layer and magnetized in a second direction opposite to the first direction; an insertion layer disposed on the second perpendicular magnetic layer; a third perpendicular magnetic layer disposed on the insertion layer and magnetized in the first direction; and a second electrode layer disposed on the third perpendicular magnetic layer.

2. The force sensor according to claim 1, wherein a magnetization direction of the second perpendicular magnetic layer is changed to the first direction when a magnetic field strength formed between the first permanent magnet layer and the second permanent magnet layer becomes a preset strength or more.

3. The force sensor according to claim 1, wherein the first to third perpendicular magnetic layers comprise a plurality of stacked bodies, wherein a magnetic layer is disposed on a heavy metal layer of the stacked bodies.

4. The force sensor according to claim 1, wherein the first to third perpendicular magnetic layers comprise an alloy of a heavy metal material and a magnetic material.

5. The force sensor according to claim 3, wherein the heavy metal layer comprises at least one of hafnium, tantalum, tungsten, rhenium, osmium, iridium, platinum and gold.

6. The force sensor according to claim 3, wherein the magnetic layer comprises at least one of iron, cobalt or nickel as a single material; an alloy comprising the single material components; and a cobalt-iron-boron alloy.

7. The force sensor according to claim 1, wherein, the second permanent magnet layer moves to an initial position when pressure applied from the outside is removed, the magnetic field strength formed between the first permanent magnet layer and the second permanent magnet layer is restored to an initially set strength, and the changed resistance value of the magnetic tunnel junction is restored to the preset resistance value.

8. The force sensor according to claim 1, further comprising a stopper layer disposed between the second permanent magnet layer and the magnetic tunnel junction and configured to restrict a movement of the second permanent magnet layer in a direction of the first permanent magnet layer.

9. The force sensor according to claim 1, wherein the first permanent magnet layer and the second permanent magnet layer are formed in a surface shape, a plurality of magnetic tunnel junctions are disposed to be spaced apart from each other by a preset space on the first permanent magnet layer, a partial region, to which a pressure is applied from outside, the second permanent magnet layer moves in a direction of the first permanent magnet layer, and, when a magnetic field strength formed between a partial region of the second permanent magnet layer and the first permanent magnet layer is formed to a preset strength or more according to a movement of the partial region of the second permanent magnet layer, the magnetic tunnel junctions sense the pressure based on a total resistance value, which comprises a changed resistance value of at least one magnetic tunnel junction corresponding to the partial region of the second permanent magnet layer, of the magnetic tunnel junctions and a preset threshold resistance value.

10. The force sensor according to claim 1, wherein a plurality of magnetic tunnel junctions are disposed on the first permanent magnet layer, and the respective magnetic tunnel junctions sense the pressure in stages due to differently formed magnetic field strength according to a change in the preset resistance value.

11. The force sensor according to claim 1, wherein the first permanent magnet layer, the second permanent magnet layer and the magnetic tunnel junction are formed in a surface shape, a partial region, to which pressure is applied from outside, the second permanent magnet layer moves in a direction of the first permanent magnet layer, and, when a magnetic field strength formed between a partial region of the second permanent magnet layer and the first permanent magnet layer is formed to a preset strength or more according to a movement of the partial region of the second permanent magnet layer, the magnetic tunnel junction senses the pressure and an area, to which the pressure is applied, based on a total resistance value, which comprises a changed resistance value of a partial region of the magnetic tunnel junction corresponding to the partial region of the second permanent magnet layer, of the magnetic tunnel junction.

12. The force sensor according to claim 11, wherein a first electrode layer and a second electrode layer are respectively comprised in top and bottom portions of the magnetic tunnel junction, and one electrode layer of the first and second electrode layers is formed in an array form and another electrode layer thereof is formed in a thin membrane shape.

13. The force sensor according to claim 1, wherein a space between the first permanent magnet layer and the second permanent magnet layer is 10 nm to 1 cm.

14. A force sensor, comprising:
a support layer having elasticity;
a plurality of permanent magnet layers comprising a first permanent magnet layer; and a second permanent magnet layer disposed on first permanent magnet layer such that a central region between the first permanent magnet layer and the second permanent magnet layer is spaced; and
a magnetic tunnel junction disposed on the central region of the first permanent magnet layer and configured to have a preset resistance value; and
fixation members disposed on opposite ends of a lower part of the support layer to fix opposite ends of the permanent magnet layers,
wherein each of the permanent magnet layers is formed in a thin membrane shape, a partial region, to which a pressure is applied from outside, of the support layer moves in a direction of the permanent magnet layers, opposite ends, on which the fixation members are disposed, of the support layer move in a direction opposite to the direction, spaces of the central region of the permanent magnet layers are reduced according to a movement to the support layer, a magnetic field strength formed at the central region is formed to a preset strength or more as the spaces are reduced, the preset resistance value of the magnetic tunnel junction is changed by the magnetic field strength formed to the preset strength or more, and the pressure is sensed based on a change in the preset resistance value.

* * * * *